United States Patent [19]
Mizutani et al.

[11] Patent Number: 4,823,038
[45] Date of Patent: Apr. 18, 1989

[54] STEPPING MOTOR

[75] Inventors: Minoru Mizutani; Kuniharu Hayashi; Hiroshi Kikuchi, all of Tokyo; Naoki Chiba, Fukushima, all of Japan

[73] Assignee: Oki Electric Industry Co., Ltd., Tokyo, Japan

[21] Appl. No.: 141,162

[22] Filed: Jan. 6, 1988

[30] Foreign Application Priority Data

Jan. 14, 1987 [JP] Japan .................................. 62-2918

[51] Int. Cl.$^4$ ........................................... H02K 21/14
[52] U.S. Cl. .................................... 310/257; 310/156; 310/49 R
[58] Field of Search .................. 310/49 A, 49 R, 112, 310/114, 156, 257

[56] References Cited

U.S. PATENT DOCUMENTS 3,508,091  4/1970  Kavanaugh ......................... 310/257
4,009,406  2/1977  Inariba .............................. 310/257

OTHER PUBLICATIONS

"Stepper Motor S1", published by Fuji Electrochemical Co. Ltd.

Primary Examiner—Patrick R. Salce
Assistant Examiner—Judson H. Jones
Attorney, Agent, or Firm—Wenderoth, Lind & Ponack

[57] ABSTRACT

A stepping motor comprises a rotor assembly including a rotor shaft, a collar coaxially fixed to the rotor shaft, and a cylindrical permanent magnet block fixedly fitted on the collar, a yoke assembly including an inner yoke having a plurality of upper pole pieces arranged at regular angular intervals corresponding to an electrical angle of $2\pi$ and a plurality of lower pole pieces arranged at regular angular intervals corresponding to an electrical angle of $2\pi$, an upper outer yoke having pole pieces formed so as to extend between the upper pole pieces of the inner yoke, and a lower outer yoke having a plurality of pole pieces formed so as to extend between the lower pole pieces of the inner yoke, first and second driving coils received in a space defined by the inner yoke and the upper outer yoke and in a space defined by the inner yoke and the lower outer yoke, respectively, a base plate fixed to the upper end surface of the upper outer yoke, a flange fixed to the lower end surface of the lower outer yoke, and bearing bushes respectively provided in the central portions of the base plate and the flange to support the rotor shaft therein for rotation. The inner yoke is formed by bending the inner periphery of a single annular plate alternately in opposite directions to form the upper pole pieces and the lower pole pieces.

4 Claims, 3 Drawing Sheets

STEPPING MOTOR

BACKGROUND OF THE INVENTION

1. Field of the Invention:

The present invention relates to a stepping motor for printers or the like and, more particularly, to a PM stepping motor.

2. Description of the Prior Art:

A stepping motor, as is generally known, is used as a driving source for moving the print head of a printer or as a driving source for feeding a printing sheet on a printer.

Referring to FIG. 5 showing a PM stepping motor for such purposes, there are shown a rotor shaft 2, a rotor 1 consisting of a collar 3 coaxially fixed to the rotor shaft 2, and a permanent magnet block 1a having magnetic poles arranged in divisions along the circumference thereof and fixedly fitted on the collar 3, inner yokes 5 and 6 and outer yokes 4 and 7. The inner periphery of each of the yokes 4, 5, 6 and 7 is bent inside to form n/4 pieces of pole pieces 8 (n is the total number of pole pieces of the yokes 4, 5, 6 and 7). The total number n of the pole pieces 8 is the number of steps for one turn of the permanent magnet block 1a. Further shown in FIG. 5 are a first driving coil 9, a second driving coil 10, a base plate 11 fixed to the outer yoke 4 by spot-welding or the like, a flange 12 fixed to the outer yoke 7 by spot-welding or the like, bushes 13 and 14 fitted in the respective central portions of the base plate 11 and the flange 12, respectivley, for rotatably supporting the rotor shaft 2 therein, and a shim 15 mounted on the rotor shaft 2 to take up the axial play of the rotor shaft 2.

As shown in FIG. 6, the permanent magnet block 1a has magnetic poles formed in the periphery thereof in circumferential divisions. As shown in FIG. 7, the inner yokes 5 and 6 are combined with positioning lugs (not shown) or positioning holes (not shown) formed in the respective inner circumference thereof coinciding with each other and are fixed together by spot-welding or the like so that the phase difference between the pole pieces 8 of the inner yoke 5 and the pole pieces 8 of the inner yoke 6 is an electrical angle of $\pi/2$ as shown in FIG. 8.

Recent progressive reductions in the cost, and size of printers and improvements in their reliability, require the compaction, reduction in thickness and improvement in performance of stepping motors to be incorporated into printers. The performance of a PM stepping motor can readily be improved by employing a rare earth magnet instead of the conventional ferrite magnet. However, the employment of a rare earth magnet increases the cost of a PM stepping motor. The performance of a PM motor can also be improved by driving the PM stepping motor by the bipolar driving system instead of the unipolar driving system. However, the employment of the bipolar driving system increases electrical parts, such as transistors, of the driving circuit resulting in an increase in the cost of the PM stepping motor.

SUMMARY OF THE INVENTION

Accordingly, it is an object of the present invention to provide a stepping motor eliminating the foregoing problems of the conventional stepping motor and having an increased torque capacity attained by incorporating yokes of a new construction enabling an increase in the number of turns of coils, and a permanent magnet rotor having a novel pole arrangement.

It is another object of the present invention to provide a stepping motor comprising less parts, requiring less work for assembly and capable of being manufactured at a less cost as compared with the conventional stepping motors.

To achieve the aforementioned objectives, the present invention provides a stepping motor comprising: a stator yoke assembly consisting of a single inner yoke having n/2 pieces of alternate upper and lower pole pieces formed by alternately bending up and down the inner periphery of an annular magnetic plate so that the phase difference between the upper and lower pole pieces is an electrical angle of $\pi$, and a pair of outer yokes each having n/4 pieces of pole pieces formed by bending the inner periphery of a magnetic plate having an L-shaped cross section inside so that the pole pieces are positioned between the pole pieces of the inner yoke; a first driving coil provided in a space defined by the inner yoke and one of the outer yokes; a second driving coil provided in a space defined by the inner yoke and the other outer yoke; a base plate fixed to the upper end surface of the yoke assembly; a flange fixed to the lower end surface of the yoke assembly; and a rotor consisting of a rotor shaft rotatably supported in bearing bushes respectively provided in the central portions of the base plate and the flange, a collar coaxially fixed to the rotor shaft, and a cylindrical magnet block axially divided in two pole sections each having a plurality of magnetic poles arranged along the circumference thereof so that the phase difference between the magnetic poles of the upper pole section and those of the lower pole section is an electrical angle of $\pi/2$.

Since the stator yoke assembly accommodating the two driving coils is formed of a single inner yoke and two outer yokes, spaces for accommodating the driving coils are increased to enable the number of turns of the driving coils to be increased, so that the torque capacity of the stepping motor is increased. Furthermore, since the stepping motor of the present invention has only a single inner yoke, the stepping motor of the present invention requires less parts and less work for assembly as compared with the conventional stepping motor having two inner yokes.

The above and other objects, features and advantages of the present invention will become fully apparent from the following description taken in conjunction with the accompanying drawings.

DESCRIPTION OF THE PREFERRED EMBODIMENT

A stepping motor, in a preferred embodiment, according to the present invention will be described hereinafter with reference to FIGS. 1 to 4.

Figure 1:
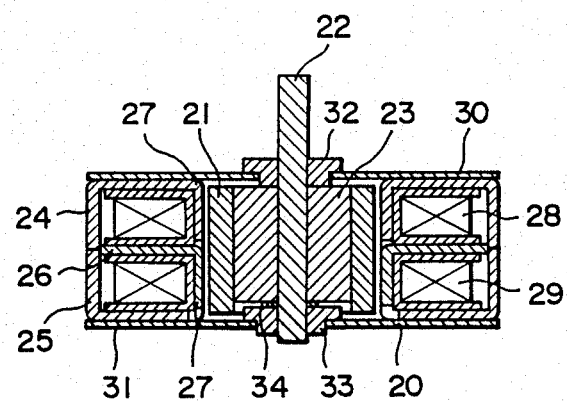
FIG. 1 a longitudinal sectional view of a stepping motor, in a preferred embodiment, according to the present invention.
Figure 2:
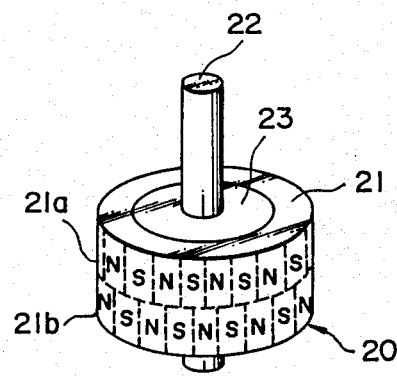
FIG. 2 is a perspective view of a permanent magnet rotor employed in the stepping motor of FIG. 1, showing a mode of magnetization.
Figure 3:
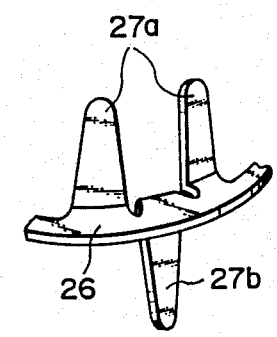
FIG. 3 is a fragmentary enlarged perspective view of an inner yoke employed in the stepping motor of FIG. 1.
Figure 8:
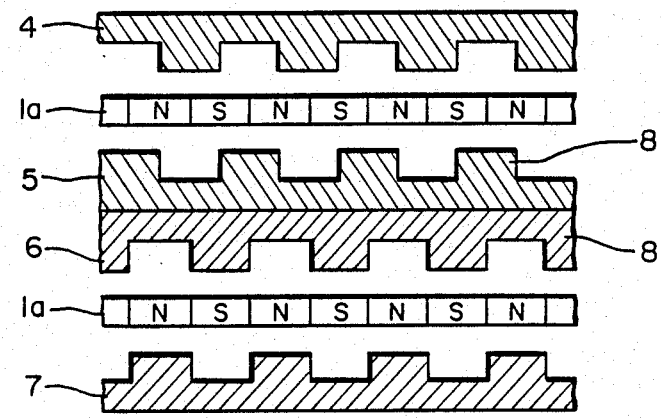
FIG. 8 is a diagrammatic illustration showing the positional relation between the magnetic poles of the permanent magnet rotor and the pole pieces of the yoke assembly of the stepping motor of FIG. 5.

Referring first to FIG. 1, the stepping motor comprises a permanent magnet rotor 20 consisting of a rotor shaft 22, a collar 23 coaxially fixed to the rotor shaft 22, and a permanent magnet block 21 axially divided into two pole sections, namely, an upper pole section 21a and a lower pole section 21b, each having a plurality of magnetic poles arranged along the circumference thereof so that the phase difference between the magnetic poles of the upper pole section 21a and those of the lower pole section 21b is an electrical angle of $\pi/2$, and fixedly fitted on the collar 23, a pair of outer yokes 24 and 25 disposed one over the other each having n/4 pieces of pole pieces 27 formed along the inner circumference thereof, an inner yoke 26 having an alternate arrangement of n/4 pieces of upper pole pieces 27a and n/4 pieces of lower pole pieces 27b as shown in FIG. 3 arranged so that the phase difference between the upper pole pieces 27a and the phase difference between the lower pole pieces 27b correspond to an electrical angle of $2\pi$, a first driving coil 28 received in a space defined by the inner yoke 26 and the upper outer yoke 24, a second driving coil 29 received in a space defined by the inner yoke 26 and the lower outer yoke 25, a base plate 30 fixed to the upper surface of the upper outer yoke 24 by spot-welding or the like, a flange 31 fixed to the lower surface of the lower outer yoke 25 by spot-welding or the like, bearing bushes 32 and 33 respectively provided in the central portions of the base plate 30 and the flange 31 to support the rotor shaft 22 therein for rotation, and a shim 34 mounted on the rotor shaft 22 to take up the axial play of the rotor 20.

Figure 4:
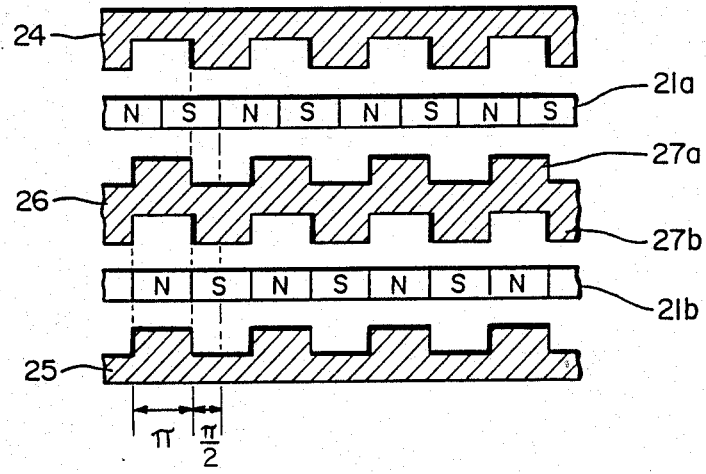
FIG. 4 is a diagrammatic illustration showing the positional relation between the magnetic poles of the permanent magnet rotor and the pole pieces of the yoke assembly of the stepping motor of FIG. 1.
Figure 5:
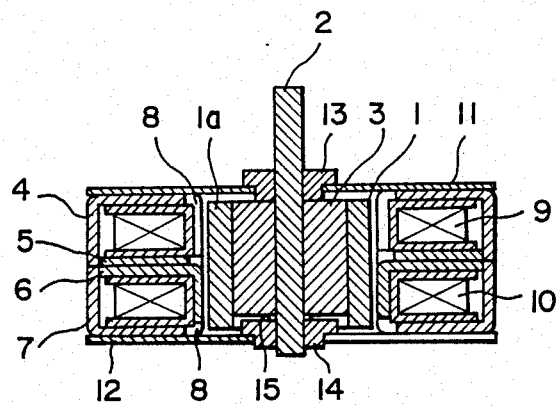
FIG. 5 is a longitudinal sectional view of a conventional stepping motor.
Figure 6:
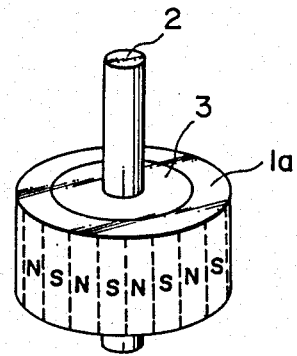
FIG. 6 is a perspective view of a permanent magnet rotor employed in the stepping motor of FIG. 5.
Figure 7:
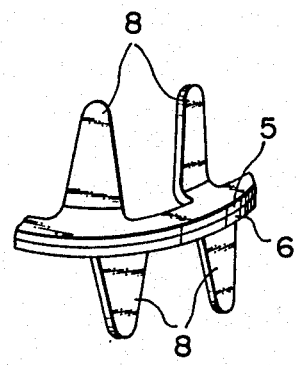
FIG. 7 is a fragmentary enlarged perspective view of a conventional inner yoke.

Accordingly, the phase difference between the upper pole pieces 27a of the inner yoke 26 and the pole pieces 27 of the upper outer yoke 24 corresponds to an electrical angle of $\pi$, and the phase difference between the lower pole pieces 27b of the inner yoke 26 and the pole pieces 27 of the lower outer yoke 25 corresponds to an electrical angle of $\pi$. Theoretically, such an arrangement of pole pieces 27a, 27b and 27 is unable to drive a rotor having the conventional construction for rotation. Accordingly, the permanent magnet block 21 is divided axially into two pole sections and each pole section is provided with a plurality of magnetic poles arranged along the circumference thereof so that the phase difference between the magnetic poles of the upper pole section and those of the lower pole section corresponds to an electrical angle of $\pi/2$ as shown in FIG. 4, to enable the first driving coil 28 and the second driving coil 20 to drive the rotor 20 for rotation.

Thus, the present invention reduces the component parts of a stepping, motor and work the required for assembling the stepping motor, thereby reducing the manufacturing cost of the stepping motor, by employing a single integral inner yoke instead of a conventional yoke which is formed by combining two inner yoke pieces by spot-welding or the like. Furthermore, since the employment of such an integral inner yoke increases spaces for receiving the first and second driving coils, the number of turns of the first and second driving coils can be increased, thereby increasing to the torque capacity and performance of the stepping motor.

Although the invention has been described in its preferred form with a certain degree of particularity, many changes and variations are possible therein. It is therefore to be understood that the invention may be practiced otherwise than specifically described herein without departing from the scope and spirit thereof.

What is claimed is:

1. A stepping motor comprising:
   a rotor assembly comprising
      a rotor shaft,
      a collar coaxially fixed to the rotor shaft,
      a cylindrical permanent magnet block fixedly fitted on the collar;
   a yoke assembly formed by fixedly combining an inner yoke, an upper outer yoke and a lower outer yoke;
   a first driving coil accommodated in a space defined by the inner yoke and the upper outer yoke;
   a second driving coil accommodated in a space defined by the inner yoke and the lower outer yoke;
   a base plate fixed to the upper surface of the upper outer yoke;
   a flange fixed to the lower surface of the lower outer yoke; and
   bearing means respectively and fixedly provided in respective central portions of the base plate and the flange to support the rotor shaft therein for rotation;
   wherein the inner yoke has n/4 (n is a number of steps for one turn of the rotor assembly) pieces of upper pole pieces arranged at regular angular intervals along an inner circumference thereof at a phase difference corresponding to an electrical angle of $2\pi$, and n/4 pieces of lower pole pieces arranged at regular angular intervals along an inner circumference thereof at a phase difference corresponding to an electrical angle of $2\pi$, and wherein a phase difference between the upper pole pieces and the lower pole pieces corresponds to an electrical angle of $\pi$, and wherein the upper outer yoke has n/4 pieces of pole pieces arranged at regular angular intervals along an inner circumference thereof at a phase difference corresponding to an electrical angle of $2\pi$ so as to extend between the upper pole pieces of the inner yoke, respectively, and wherein a phase difference between the pole pieces of the upper outer yoke and the upper pole pieces of the inner yoke correspond to an electrical angle of $\pi$, and wherein the lower yoke has n/4 pieces of pole pieces arranged at regular angular intervals along the inner circumference thereof at a phase difference corresponding to an electrical angle of $2\pi$ so as to extend between the lower pole pieces of an inner yoke, and wherein a phase difference between the pole pieces of the lower outer yoke and the lower pole pieces of the inner yoke correspond to an electrical angle of $\pi$, and wherein the cylindrical permanent magnet block is divided axially into an upper pole section and a lower pole section each having a plurality of magnetic poles arranged along a circumference thereof so that the phase difference between magnetic poles of the upper pole section and magnetic poles of the lower pole section corresponds to an electrical angle of $\pi/2$.

2. A stepping motor according to claim 1, wherein said inner yoke is an integral member formed by bending the inner periphery of an annular plate alternately in opposite directions to form the upper pole pieces and the lower pole pieces so that the phase difference between the upper pole pieces and the lower pole pieces corresponds to an electrical angle of $\pi$.

3. A stepping motor according to claim 1, wherein a shim is mounted on the rotor shaft between said collar and either one of said bearing means to take up the axial play of said rotor assembly.

4. A stepping motor according to claim 1, wherein said bearing means are bearing bushes.

* * * * *